US006977798B2

(12) United States Patent
Schulz et al.

(10) Patent No.: US 6,977,798 B2
(45) Date of Patent: Dec. 20, 2005

(54) STIFFENED SUSPENSION FOR A STORAGE DEVICE HAVING A LAYER OF COMPOSITE MATERIAL

(75) Inventors: Kevin J. Schulz, Apple Valley, MN (US); Marsha A. Huha, Minneapolis, MN (US); Sandeepan Bhattacharya, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/083,054

(22) Filed: Feb. 26, 2002

(65) Prior Publication Data

US 2002/0176209 A1 Nov. 28, 2002

Related U.S. Application Data

(60) Provisional application No. 60/293,286, filed on May 23, 2001.

(51) Int. Cl.$^7$ ............................................. G11B 21/16
(52) U.S. Cl. ................................................... 360/244.3
(58) Field of Search ........................... 360/244.3, 244.9

(56) References Cited

U.S. PATENT DOCUMENTS

| | | | |
|---|---|---|---|
| 4,543,295 A * | 9/1985 | St. Clair et al. ............ 428/458 |
| 4,670,804 A | 6/1987 | Kant et al. .................. 360/102 |
| 4,760,478 A * | 7/1988 | Pal et al. .................. 360/244.3 |
| 4,991,045 A * | 2/1991 | Oberg ..................... 360/244.3 |
| 4,996,623 A | 2/1991 | Erpelding et al. ........... 360/104 |
| 5,187,625 A * | 2/1993 | Blaeser et al. ............ 360/244.3 |
| 5,282,103 A * | 1/1994 | Hatch et al. .............. 360/244.2 |
| 5,296,983 A * | 3/1994 | Blanc et al. .............. 360/244.3 |
| 5,408,372 A | 4/1995 | Karam, II .................... 360/104 |
| 5,594,607 A * | 1/1997 | Erpelding et al. ........ 360/244.3 |
| 5,606,477 A * | 2/1997 | Erpelding et al. ........ 360/244.3 |
| 5,764,444 A | 6/1998 | Imamura et al. ......... 360/294.4 |
| 5,771,135 A * | 6/1998 | Ruiz et al. ............... 360/244.3 |
| 5,793,569 A * | 8/1998 | Christianson et al. .... 360/244.3 |
| 5,875,071 A * | 2/1999 | Erpelding et al. ........ 360/244.3 |
| 5,875,072 A * | 2/1999 | Brooks et al. ........... 360/244.3 |
| 5,955,176 A * | 9/1999 | Erpelding et al. ........ 360/244.3 |
| 5,978,178 A | 11/1999 | Adley ........................ 360/104 |
| 6,091,578 A * | 7/2000 | Stole et al. .............. 360/265.9 |
| 6,157,522 A | 12/2000 | Murphy et al. .......... 360/294.4 |
| 6,215,622 B1 * | 4/2001 | Ruiz et al. ............... 360/244.3 |
| 6,351,348 B1 * | 2/2002 | Erpelding et al. ........ 360/244.3 |

FOREIGN PATENT DOCUMENTS

| | | | | |
|---|---|---|---|---|
| EP | 0 617 411 A2 | * | 9/1994 | |
| JP | 10249865 A | * | 9/1998 | ........... B29C 37/00 |
| WO | WO 01/14766 A1 | * | 3/2001 | |

OTHER PUBLICATIONS

PCT International Search Report for PCT/US02/06006, Filed Feb. 26, 2002.

* cited by examiner

Primary Examiner—William J Klimowicz
(74) Attorney, Agent, or Firm—Theodore M. Magee; Westman, Champlin & Kelly, P.A.

(57) ABSTRACT

A suspension for a storage device includes a metal layer and one or more composite stiffeners bonded to the metal layer to stiffen part but not all of the suspension. The composite stiffeners are made of a composite material and are bonded to the metal layer by an adhesive. Under most embodiments, the composite material has a higher stiffness to weight ratio than a metal.

25 Claims, 4 Drawing Sheets

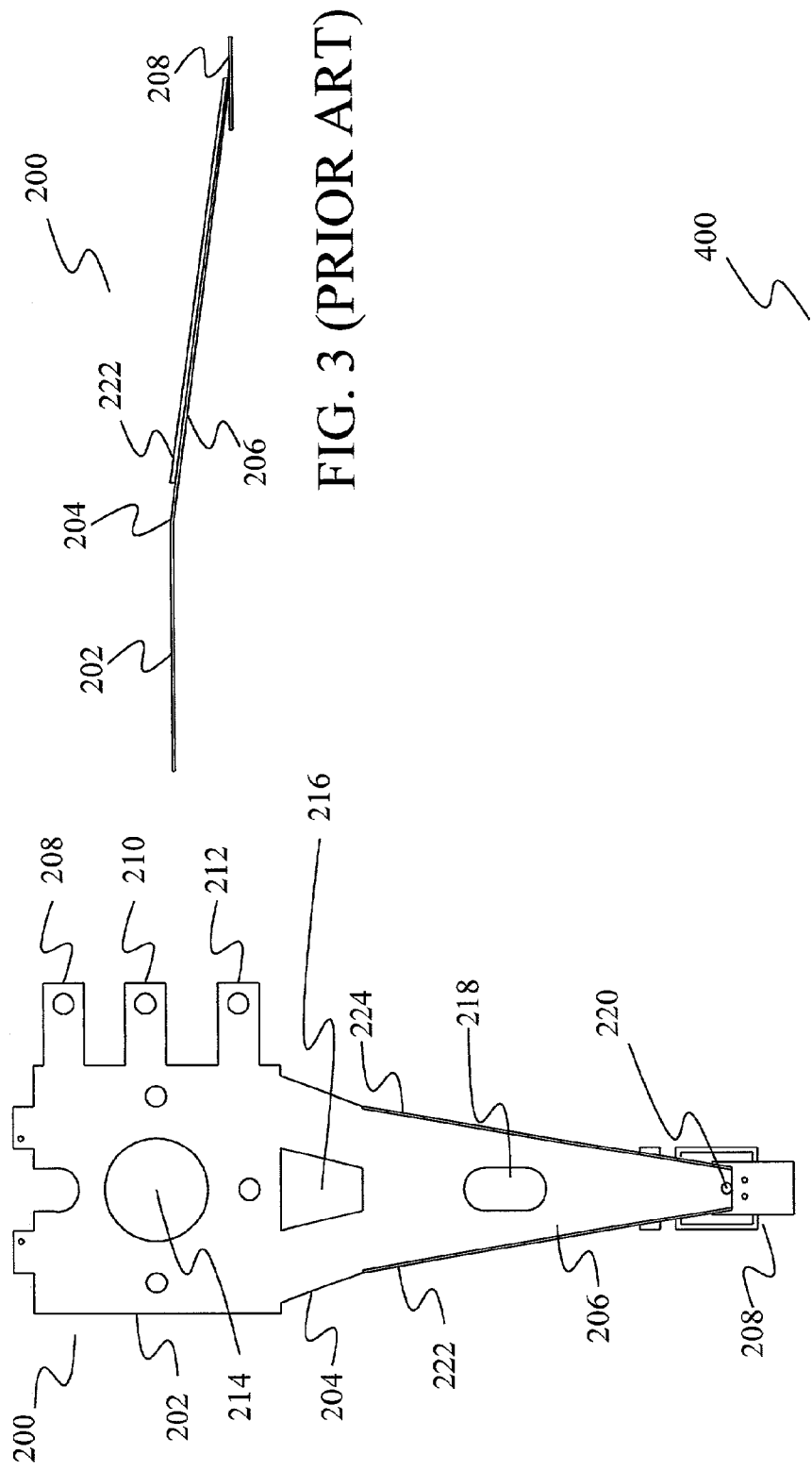
FIG. 2 (PRIOR ART)
FIG. 3 (PRIOR ART)
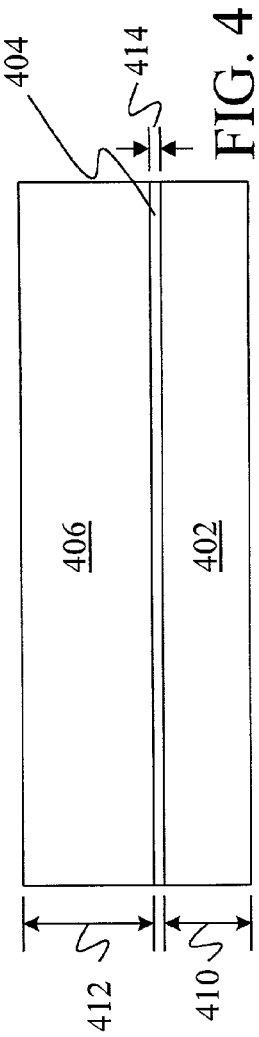
FIG. 4

STIFFENED SUSPENSION FOR A STORAGE DEVICE HAVING A LAYER OF COMPOSITE MATERIAL

CROSS-REFERENCE TO RELATED APPLICATION

This application claims priority from U.S. Provisional application No. 60/293,286 filed on May 23, 2001 and entitled SUSPENSION DESIGN USING COMPOSITE STIFFENERS.

FIELD OF THE INVENTION

The present invention relates to storage devices. In particular, the present invention relates to suspension assemblies in storage devices.

BACKGROUND OF THE INVENTION

In data storage devices, data is typically stored in tracks on a medium. To access the data, a head is positioned within a track while the medium moves beneath the head.

In many data storage devices, the head is positioned by an actuator assembly that includes a motor that rotates one or more actuator arms. Each actuator arm supports a suspension that in turn supports a head/gimbal assembly. Typically, the suspension includes three distinct areas: a base plate area that connects to the actuator arm, a spring area that provides a vertical spring force to bias the head toward the medium, and a load beam that extends from the spring area to the head/gimbal assembly. The spring force provided by the suspension is designed to allow the head to follow height variations on the surface of the medium without impacting the medium or moving too far away from the medium.

In the past, suspensions have typically been formed from sheets of stainless steel. Stainless steel is used because it provides the desired spring force for the head, it has mechanical properties that are relatively insensitive to heat, it does not outgas, and it can be welded to other parts of the actuator assembly.

In some prior art systems, using sheets of stainless steel results in a suspension in which the spring area and the load beam are the same thickness. Because of this, both areas exhibit similar mechanical properties. However, because the spring area and the load beam perform different functions, it is desirable that they have different mechanical properties. In particular, it is desirable that the spring area be more elastic or flexible than the load beam because a load beam that is too elastic will tend to bend and resonate in response to windage induced forces.

To solve this problem, the prior art has developed several techniques for forming a suspension so that the thickness of the spring area is less than the thickness of the load beam. In one technique, the spring area is partially etched to reduce its thickness. However, partial etching provides poor thickness control of the partially etched portions and results in poor pre-load stability in the spring area. A second technique welds a second metal sheet to the load beam. However, welding is costly and causes distortion of the load beam due to the heating of the metal. In addition, welding requires a minimum surface area that will not be present in smaller suspensions of the future.

A third technique taught by the art is to form the suspension through lamination. For example, U.S. Pat. No. 4,996,623 shows a suspension in which the load beam is formed with a polyimide layer sandwiched between a copper layer and a stainless steel layer. In the '623 patent, the copper layer and stainless steel layer are bonded to the polyimide using an adhesive such as a polyimide-based liquid adhesive.

Although laminated structures of the past help dampen some oscillations in the suspension, the use of two layers of metal in the laminate is undesirable because of the relatively low stiffness to mass ratio of most metals.

The present invention provides a solution to these and other problems, and offers other advantages over the prior art.

SUMMARY OF THE INVENTION

A suspension for a storage device includes a metal layer and one or more composite stiffeners bonded to the metal layer to stiffen part but not all of the suspension. The composite stiffeners are made of a composite material and are bonded to the metal layer by an adhesive. Under most embodiments, the composite material has a higher stiffness to weight ratio than a metal.

These and various other features as well as advantages which characterize embodiments of the present invention will be apparent upon reading the following detailed description and review of the associated drawings.

BRIEF DESCRIPTION OF THE DRAWINGS

FIG. 2 is a top view of a suspension under the prior art.

FIG. 3 is a side view of a suspension under the prior art.

FIG. 4 is a cross section of one embodiment of a laminate structure used on suspensions of the present invention.

DETAILED DESCRIPTION OF ILLUSTRATIVE EMBODIMENTS

Figure 1:
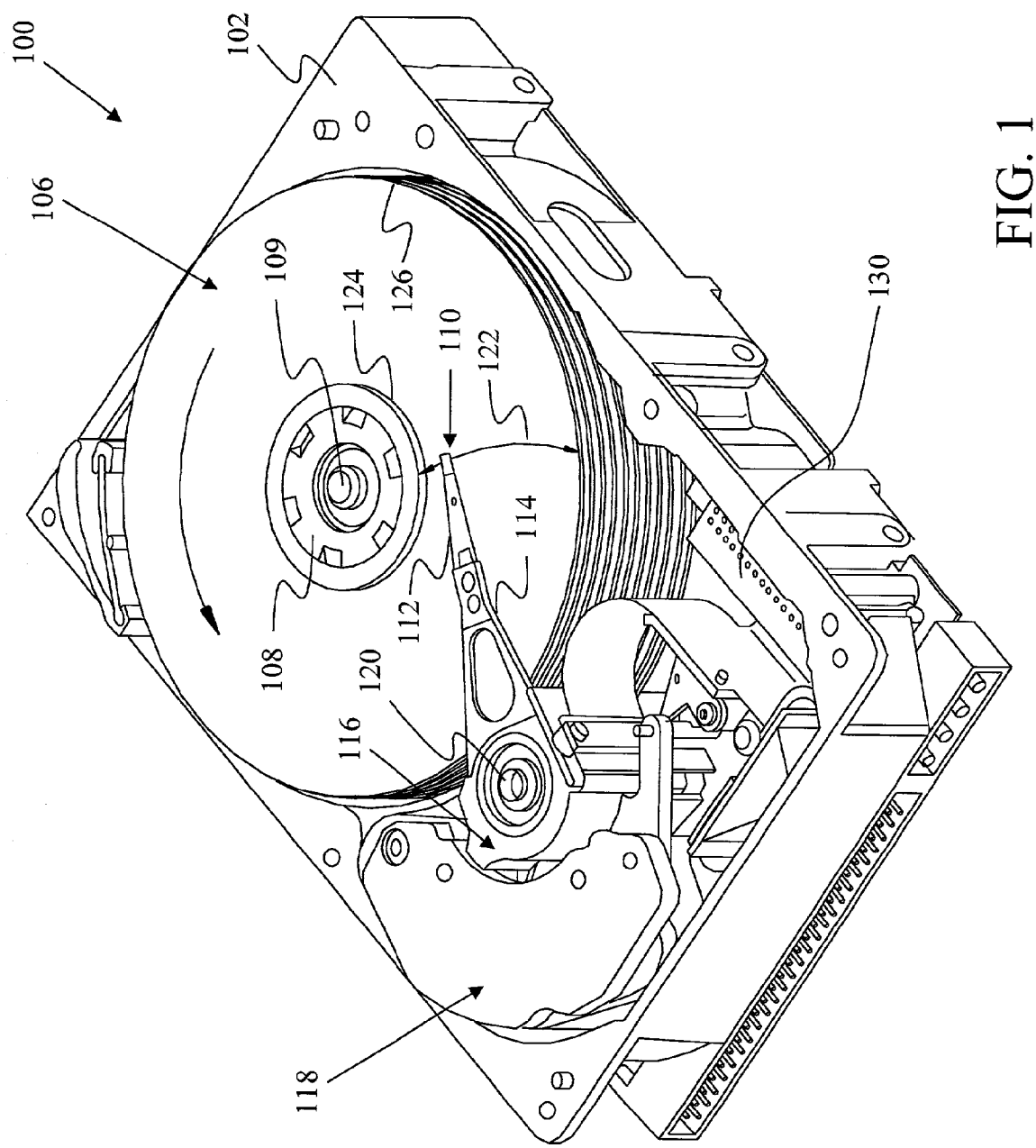
FIG. 1 is an isometric view of a disc drive in which embodiments of the present invention may be practiced.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle 109 by a disc clamp 108. Disc pack 106 includes a plurality of individual discs, which are co-rotated about spindle 109 by a spindle motor (not shown) attached to the bottom of spindle 109. Each disc surface has an associated disc head slider 110 which is mounted to disc drive 100 for communication with the disc surface. As the disc pack is rotated, it generates air circulation through the drive and in particular generates an air bearing between each head slider 110 and each disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

FIGS. 2 and 3 provide a top view and a side view, respectively, of a suspension 200 of the prior art. Suspension 200 includes a base plate area 202, a spring area 204 and a load beam area 206.

Base plate area 202 is designed to be welded to a base plate (not shown) that is later swaged to an actuator arm. The base plate generally extends beneath the entire base plate area with a portion of the base plate extending through an opening 214 in the suspension. The base plate area also includes three flex circuit tabs 208, 210, and 212, that extend to one side of the base plate area and that provide a structure to support a flex circuit. In general, the flex circuit is woven between the tabs such that it is above tabs 208 and 212 and below tab 210.

Spring area 204 is located between base plate area 202 and load beam 206. A gap 216 in spring area 204 is designed to reduce the stiffness of the spring area so that the spring area resiliently bends in response to aerodynamic lifting forces applied to the head.

Load beam 206 extends from spring area 204 to a gimbal assembly 208, which holds a head (not show). Load beam 206 includes a through hole 218 that is provided to reduce the weight of the suspension and a dimple 220 that provides a pivot point for the gimbal assembly. When the medium is moving, the gimbal assembly pitches and rolls about the pivot point in response to aerodynamic forces that are applied to the head. Load beam 206 also includes a pair of side rails 222 and 224 that are formed by bending the edges of the load beam upward.

As noted in the background, some prior art systems have increased the stiffness of portions of the suspension by building laminate structures. At least one embodiment of the present invention provides a suspension in which the load beam and/or the base plate area are formed by a laminate structure that includes at least one layer of composite material that stiffens the load beam and/or the base plate. Such composite materials are different from and have a higher stiffness to mass ratio than most metals such as copper and stainless steel that were used in the past to form laminate suspensions. Because of their higher stiffness to mass ratio, the composites of the present invention result in better suspension performance than metal on metal laminates of the prior art. FIG. 4 provides a cross section of one embodiment of a laminate structure under the present invention.

In FIG. 4, laminate structure 400 includes a thin bottom layer 402, an adhesive layer 404, and a thick top layer 406. In most embodiments, thin bottom layer 402 is formed from a sheet of stainless steel that defines the body of the suspension. Thick top layer 406 is formed of any number of composite materials including high performance plastics (such as Ultem or Liquid Crystal Polymer), reinforced plastics (such as epoxy with carbon fibers, particles, or fabric), metal matrix composite (such as Aluminum with Alumina fibers), ceramics (such as Zirconia, alumina, boron nitride, or sapphire), and glasses (such as silica glass).

In some embodiments, the thickness 410 of thin layer 402 is selected based on the desired spring force for the spring area. Typically, thickness 402 is between 1–1.5 mils (0.0025–0.0037 cm). In many embodiments, thickness 412 of thick layer 406 is 2–5 mils (0.005–0.0125 cm). The thickness 414 of adhesive 404 is largely dependent on the type of adhesive used. In some embodiments, a polyimide-based liquid adhesive is used. In other embodiments, an adhesive identified as Emcast 712 from Electronic Materials, Inc. of Breckenridge, Colo. is used as adhesive 404. In general, the adhesive thickness 414 is 0.01 mil–0.10 mil (0.000025 cm–0.00025 cm). In still further embodiments, a liquid polyimide layer is applied to the stainless steel layer and the composite material is placed on top of the liquid polyimide before the polyimide is cured.

Figure 6:
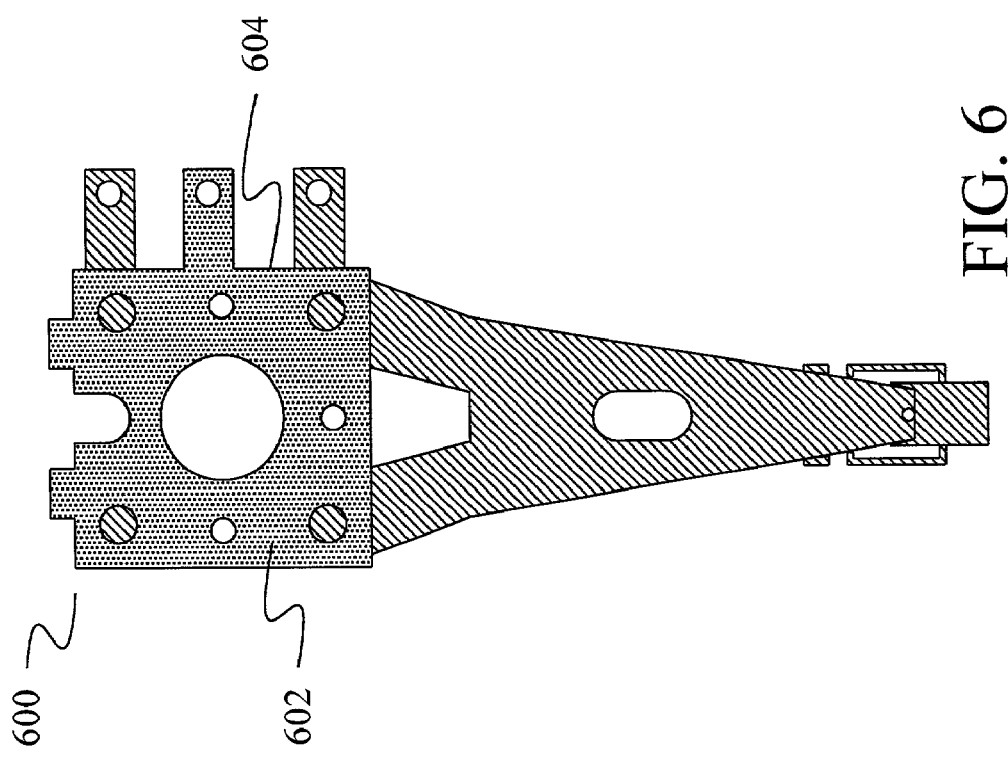
FIG. 6 is a top view of a further embodiment of a suspension under the present invention.
Figure 5:
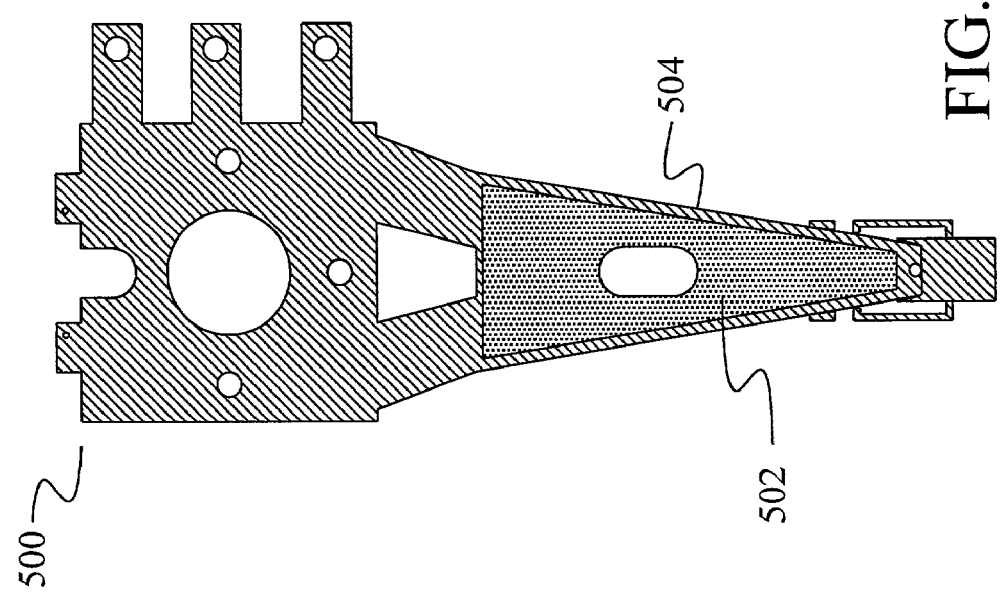
FIG. 5 is a top view of one embodiment of a suspension under the present invention.
Figure 7:
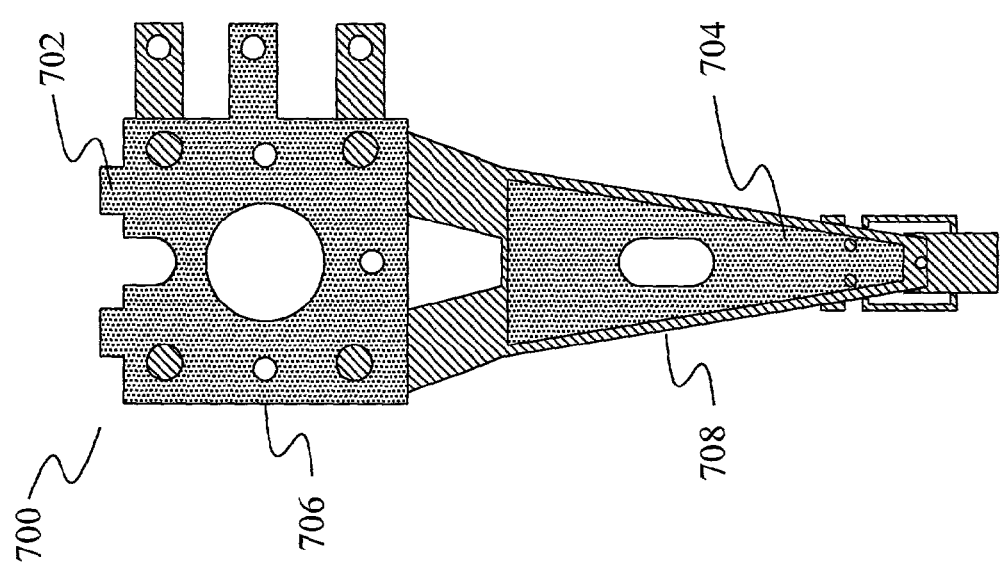
FIG. 7 is a top view of a further embodiment of a suspension under the present invention.

FIGS. 5–7 show various positions for the composite stiffeners of the thick laminate layer under embodiments of the present invention. In FIG. 5, a composite stiffener 502 is applied to a load beam 504 of a suspension 500. In FIG. 6, a composite stiffener 602 is applied to a base area 604 of a suspension 600. FIG. 7 shows an embodiment in which composite stiffeners 702 and 704 are applied to a base area 706 and a load beam 708, respectively, of a suspension 700.

Under one embodiment of the present invention, the suspension with composite stiffeners is formed by first forming the stainless steel layer of the suspension using current known techniques. The composite stiffeners are then cut from a sheet of composite material using laser precision cutting. Adhesive is applied to the suspension and the cut stiffener is placed on the adhesive using a "pick and place" robotic system such as the systems used in integrated circuit manufacturing.

Under a second embodiment, a sheet of composite material is bonded to a sheet of stainless steel to form a laminate. The laminate or the steel sheet is then etched to form the general shape of the suspension. The composite material and adhesive is then selectively etched to expose the stainless steel in certain areas of the suspension, thereby leaving the composite stiffener only in desired places on the suspension.

Figure 8:
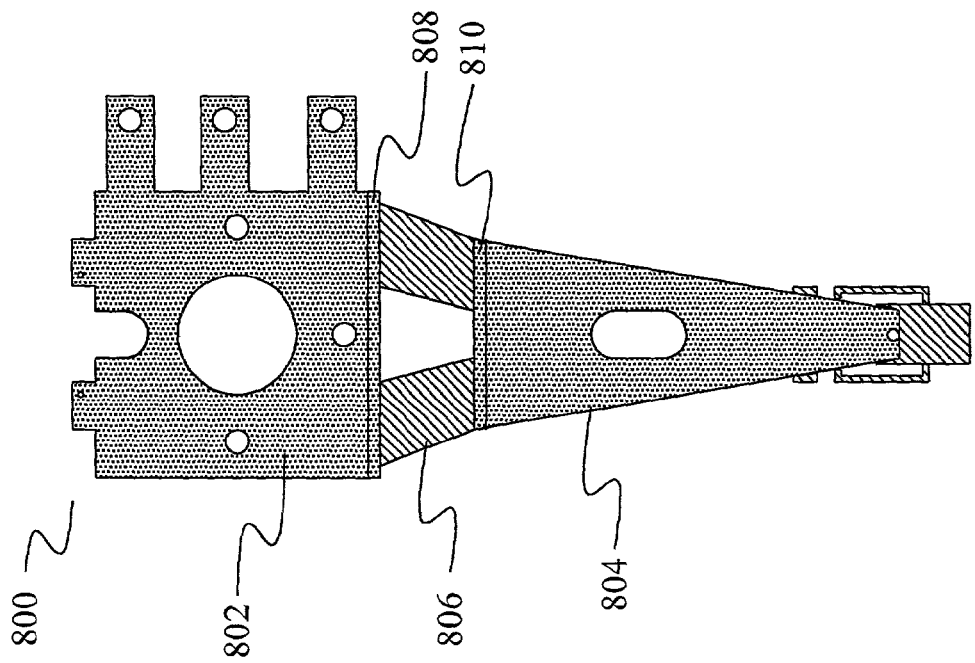
FIG. 8 is a top view of a further embodiment of a suspension under the present invention.

FIG. 8 provides a top view of a suspension 800 of an additional embodiment of the present invention. In suspension 800, base area 802 and load beam 804 are formed only of a composite material and spring area 806 is formed only of a metal. The metal of spring area 806 is bonded to base area 802 and load beam 804 along two bonding areas 808 and 810, respectively. Under most embodiments, the metal is bonded to the composite material with an adhesive.

Note that although both the base area and the load beam are shown as being formed of a composite material in FIG. 8, in other embodiments, only one of these two areas is formed of a composite material.

In summary, a data storage device (such as 100) is provided that includes a suspension (such as 500, 600, 700, 800). The suspension includes a metal (such as 402, 806), an adhesive (such as 404) and a composite material (such as 406, 802, 804). In some embodiments, the composite material is positioned over a load beam (such as 504) and/or a base area (such as 604).

A suspension is also provided that includes a suspension body (such as 504, 604, 706, 708) and a composite stiffener (such as 502, 602, 704, 702) that is formed from a composite material and that is bonded to a portion of the suspension body.

A suspension (such as 504, 604, 706, 708) also includes a suspension body and stiffener means formed of a composite material for increasing the stiffness of selected areas (such as 504, 604, 706, 708) of the suspension.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the composite stiffeners while maintaining substantially the same functionality without departing from the scope and spirit of the present invention. In addition, although the preferred embodiment described herein is directed to a suspension for a disc drive system, it will be appreciated by those skilled in the art that the teachings of the present invention can be applied to other systems, like tape drive systems, without departing from the scope and spirit of the present invention.

What is claimed is:

1. A suspension comprising:
   a metal material defining at least a portion of the suspension;
   an adhesive bonded to a portion of the metal material; and
   a composite material having a higher stiffness to weight ratio than the metal material and being bonded to the same adhesive layer that is bonded to the metal material, the adhesive layer being thinner than 0.00025 cm.

2. The suspension of claim 1 wherein the metal material defines a load beam of the suspension and the adhesive and the composite material are positioned on the load beam.

3. The suspension of claim 1 wherein the metal material defines a base area of the suspension and the adhesive and the composite material are positioned on the base area.

4. The suspension of claim 1 wherein the metal material defines a spring area having a first bonding area, the composite material defines a load beam having a second bonding area and the adhesive is bonded between the first bonding area and the second bonding area.

5. The suspension of claim 1 wherein the metal material defines a spring area having a first bonding area, the composite material defines a base area having a second bonding area and the adhesive is bonded between the first bonding area and the second bonding area.

6. The suspension of claim 1 wherein the composite material comprises a high performance plastic.

7. The suspension of claim 6 wherein the composite material comprises a liquid crystal polymer.

8. The suspension of claim 1 wherein the composite material comprises a reinforced plastic.

9. The suspension of claim 1 wherein the composite material comprises a metal matrix composite.

10. The suspension of claim 9 wherein the metal matrix composite comprises aluminum with alumina fibers.

11. The suspension of claim 1 wherein the composite material comprises a ceramic material.

12. The suspension of claim 1 wherein the composite material comprises a glass material.

13. A suspension comprising:
    a suspension body formed from a layer of metal; and
    a composite stiffener formed from a composite material having a higher stiffness to weight ratio than the layer of metal and bonded directly to a portion of the suspension body by a single adhesive layer that is thinner than 0.00025 cm.

14. The suspension of claim 13 wherein the composite stiffener is bonded to a base area of the suspension body.

15. The suspension of claim 13 wherein the composite stiffener is bonded to a load beam of the suspension body.

16. The suspension of claim 13 wherein the composite material comprises a high performance plastic.

17. The suspension of claim 13 wherein the composite material comprises a reinforced plastic.

18. The suspension of claim 13 wherein the composite material comprises a metal matrix composite.

19. The suspension of claim 13 wherein the composite material comprises a ceramic material.

20. The suspension of claim 13 wherein the composite material comprises a glass material.

21. A suspension comprising:
    a suspension body formed from a layer of metal; and
    stiffener means formed of a composite material having a higher stiffness to weight ratio than the layer of metal for increasing the stiffness of selected areas of the suspension and bonded directly to the suspension body by a single adhesive layer that is thinner than 0.00025 cm.

22. The suspension of claim 21 wherein the stiffener means comprises a composite material bonded to a base area of the suspension body.

23. The suspension of claim 21 wherein the stiffener means comprises a composite material bonded to a load beam of the suspension body.

24. The suspension of claim 21 wherein the stiffener means comprises a composite material having a higher stiffness to mass ratio than the layer of metal.

25. The suspension of claim 21 wherein the stiffener means comprises a metal matrix.

* * * * *